United States Patent [19]
Najer et al.

[11] 3,857,945
[45] Dec. 31, 1974

[54] PHARMACEUTICAL COMPOSITIONS CONTAINING PIPERAZINE DERIVATIVES IN THE TREATMENT OF PAIN

[75] Inventors: Henry Najer, Paris; Philippe Michel Jacques Manoury, L. Hay-les-Roses; Andre Pierre Fernand, Bagneux; Don Pierre Rene Lucien Giudicelli, Fontenay-sous-Bois, all of France

[73] Assignee: Synthelabo, Paris, France

[22] Filed: Apr. 2, 1974

[21] Appl. No.: 457,201

[30] Foreign Application Priority Data
Apr. 5, 1973 France .............................. 73.12278
Mar. 4, 1974 France ............................. 74.07276

[52] U.S. Cl. ................................................. 424/250

[51] Int. Cl. ........................................... A61k 27/00
[58] Field of Search .................................... 424/250

Primary Examiner—Stanley J. Friedman
Attorney, Agent, or Firm—Armstrong, Nikaido & Wegner

[57] ABSTRACT

Piperazines of the formula:

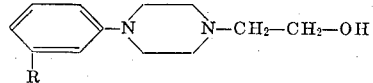

in which R is $CF_3$, $OCF_3$, or $-SCF_3$ and their salts have interesting anti-inflammatory and, especially analgesic properties.

16 Claims, No Drawings

PHARMACEUTICAL COMPOSITIONS CONTAINING PIPERAZINE DERIVATIVES IN THE TREATMENT OF PAIN

The present invention relates to pharmaceutical compositions containing piperazine derivatives.

In French application No. 72/15,642 of 3rd May, 1972, now U.S. Pat. No. 2,186,237 of Jan. 11,, 1974, compounds are described having the formula:

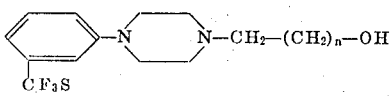

where are used as intermediates in the synthesis of medicines.

It has now been found that such compounds themselves possess valuable pharmacological properties, especially when administered as a salt, e.g., as mentioned below, or with phenylbutazone or hydroxyphenylbutazone.

The present invention accordingly provides pharmaceutical compositions containing, as active principle, an effective amount of a piperazine of the formula:

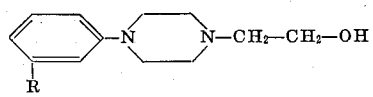
(I)

in which R is $CF_3$, $OCF_3$ or $SCF_3$, or an addition salt thereof with a pharmaceutically tolerated acid, especially hydrochloric acid, benzoic acid, salicylic acid, and 2-acetoxy-benzoic acid.

The compounds of formula I can be prepared by reacting a compound of the formula:

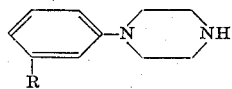
(II)

where R is as hereinbefore defined, with a halogenated alcohol of formula $X - CH_2 - CH_2OH$ or with ethylene oxide.

The reaction with the halogenated alcohol is preferably carried out in a solvent, especially an alcohol or a ketone, at the reflux temperature in the presence of an acceptor for a hydrogen halide. The rection with ethylene oxide is preferably carried out in an alcohol, at a temperature from 40° to 100°C.

The aminoalcohols of formula (I) thus obtained can be converted into their acid addition salts by reaction, in an organic solvent, with a pharmaceutically tolerated acid, such as one of those mentioned above, followed by evaporation of the solvent under reduced pressure. The organic solvent can be, for example, dichloromethane or methanol.

Examples 1 to 4 illustrate the preparation of the aminoalcohols of formula (I) and Examples 5 to 7 the preparation of their acid addition salts.

EXAMPLE 1

2-(4-m-Trifluoromethylphenyl-piperazino)-ethanol

A suspension of 200 g (0.869 mol) of 1-m-trifluoromethylphenyl-piperazine, 150 g (1.20 mols) of 2-bromoethanol and 127.2 g (1.2 mols) of sodium carbonate in 700 ml of ethanol is heated at the reflux temperature, with vigorous stirring. After heating for 6 hours, the inorganic salts are removed by hot filtration of the reaction mixture. The filtrate is evaporated to dryness and the residue is taken up in diethyl ether. The ether solution is washed with water and dried over magnesium sulphate. The solution is filtered, the solvent is driven off from the filtrate and the remaining oil is distilled under reduced pressure. 190 g (yield = 79 percent) of 2-(4-m-trifluoromethylphenyl-piperazino)-ethanol, b.p. 143°–144°C/0.01 mm.Hg are obtained.

Analysis: $C_{13}H_{17}F_3N_2O$ (M.W. = 274.287)

| | C | H | N |
|---|---|---|---|
| Calculated %: | 56.93 | 6.25 | 10.21 |
| Found %: | 56.85 | 6.29 | 10.17 |

EXAMPLE 2

2-(4-m-Trifluoromethylphenyl-piperazino)-ethanol 23 g (0.1 mol) of 1-m-trifluoromethylphenyl-piperazine are introduced into a pressure apparatus, cooled by a bath of ice and salt. 4.85 g (0.11 mol) of ethylene oxide which has been cooled beforehand are then added, followed by 15 ml of 98 percent methanol. The apparatus is closed and the mixture is heated at 60°C. for 8 hours. The mixture is then cooled, and the excess ethylene oxide followed by the methanol are evaporated. The residue is distilled under reduced pressure. 22.8 g (yield = 83.6 percent) of 2-(4-m-trifluoromethylphenyl-piperazino)-ethanol, similar to the product of Example 1, are obtained, b.p. 142°–143°C/0.01 mm.Hg.

EXAMPLE 3

2-(4-m-Trifluoromethylthiophenyl-piperazino-ethanol 26.3 g (0.10 mol) of 1-m-trifluoromethylthiophenyl-piperazine, 12.2 g (0.15 mol) of 2-chloro-ethanol, 15.9 g (0.15 mol) of sodium carbonate and 300 ml of ethanol are introduced into a flask equipped with a stirrer. After the suspension has been heated for 6 hours at the reflux temperature, the solid phase is removed by filtering the boiling reaction mixture. The ethanol is evaporated from the filtrate, the residue is taken up in diethyl ether, a slight amount of insoluble matter is filtered off, and the other solution is washed with water and dried over magnesium sulphate. The ether is driven off and the product is distilled under reduced pressure. 26.85 g (yield = 87.6 percent) of 2-(4-m-trifluoromethylthiophenyl-piperazino)-ethanol are thus obtained b.p. 182°C/0.01 mm.Hg.

Analysis: $C_{13}H_{17}F_3N_2OS$ (M.W. = 306.351)

| | C | H | N |
|---|---|---|---|
| Calculated %: | 50.97 | 5.59 | 9.14 |
| Found %: | 50.82 | 5.67 | 9.08 |

EXAMPLE 4

2-(4-m-Trifluoromethoxyphenyl-piperazino)-ethanol 28.6 g (0.116 mol) of 1-m-trifluoromethoxyphenyl-piperazine, 16.8 g (0.135 mol) of 2-bromo-ethanol, 14.3 g (0.135 mol) of sodium carbonate and 300 ml of 4-methyl-2- pentanone are mixed. The mixture is heated at the reflux temperature for 5 hours, with stirring. The boiling reaction mixture is filtered to remove the inorganic salts, the solvent is driven off from the filtrate, and the product is distilled under reduced pressure. The reaction of the distillate which passes over at 155° to 158°C under a presusre of 0.01 mm.Hg is collected. 22.1 g (yield = 65 percent) of 2-(4-m-trifluoromethoxyphenyl-piperazino)-ethanol are thus obtained.

Analysis: $C_{13}H_{17}F_3N_2O_2$ (M.W. = 290.287)
| | | | |
|---|---|---|---|
| Calculated %: | C 53.79 | H 5.90 | N 9.65 |
| Found %: | 53.68 | 5.97 | 9.58 |

EXAMPLE 5

2-(4-m-Trifluoromethylphenyl-piperazino)-ethanol monohydrochloride. (Code number: SLB 092)

13.7 g (0.05 mol) of 2-(4-m-trifluoromethylphenyl-piperazino)-ethanol, produced according to Example 1 or 2, are dissolved in 100 ml of dichloromethane, and 12.5 ml of a 4N solution of hydrogen chloride in ethanol are then added slowly with stirring. The solvents are evaporated under reduced pressure. The residue is dissolved in boiling 2-propanol, the solution is cooled on ice, and the hydrochloride which has formed is filtered off and dried. 13.2 g (yield = 85.2 percent) of 2-(4-m-trifluoromethylphenyl-piperazino)-ethanol monohydrochloride, m.p. 224°C, are thus obtained.

Analysis: $C_{13}H_{18}ClF_3N_2O$ (M.W. = 310.748)
| | | | | |
|---|---|---|---|---|
| Calculated %: | C 50.25 | H 5.84 | N 9.01 | Cl⁻ 11.48 |
| Found %: | 50.32 | 5.93 | 9.08 | 11.21 |
| | 50.18 | 6.10 | 8.94 | 11.32 |

EXAMPLE 6

2-(4-m-Trifluoromethylthiophenyl-piperazino)-ethanol monohydrochloride. (Code number: SLB 151)

7.5 ml of a 4N solution of hydrogen chloride in ethanol are added to a solution of 9.2 g (0.03 mol) of 2-(4-m-trifluoromethylthiophenyl-piperazino)-ethanol, produced according to Example 3, in 70 ml of dichloromethane. The solvents are evaporated and the residue is recrystallized from 2-propanol. 9.25 g of 2-(4-m-trifluoromethylthiophenyl-piperazino)-ethanol monohydrochloride, m.p. 152°C, are thus obtained.

Analysis: $C_{13}H_{18}ClF_3N_2OS$ (M.W. = 342.812)
| | | | | |
|---|---|---|---|---|
| Calculated %: | C 45.54 | H 5.29 | N 8.17 | Cl⁻ 10.34 |
| Found %: | 45.67 | 5.26 | 8.15 | 10.57 |
| | 45.64 | 5.37 | 8.14 | 10.59 |

EXAMPLE 7

2-(4-m-Trifluoromethylphenyl-piperazino)-ethanol mono-2-acetoxy-benzoate. (Code number: SLB 261)

9.55 g (0.053 mol) of 2-acetoxy-benzoic acid are added, with stirring, to a solution of 15.08 g (0.055 mol) of 2-(4-m-trifluoromethylphenyl-piperazino)-ethanol in 100 ml of methanol. The reaction mixture is evaporated under reduced pressure. The oily residue is taken up in boiling 2-propanol, the solution is cooled with ice, and the precipitate is filtered off, washed with 2-propanol and then with petroleum ether and dried in vacuo at ambient temperature. 22.2 g (yield = 92.2 percent) of 2-(4-m-trifluoromethylphenyl-piperazino)-ethanol mono-2-acetoxy-benzoate, m.p. 95°C., are thus obtained.

Analysis: $C_{22}H_{25}F_3N_2O_5$ (M.W. = 454.449)
| | | | |
|---|---|---|---|
| Calculated %: | C 58.14 | H 5.54 | N 6.28 |
| Found %: | 57.92 | 5.57 | 6.14 |
| | 58.10 | 5.59 | 6.07 |

Other salts of the compounds of formula I can all be produced in a manner similar to that given above.

The compounds were subjected to a series of pharmacological tests which demonstrated their valuable properties, and particularly their analgesic properties. The results relating to compounds SL B 092, SL B 151 and SL B 261, which are representative of the series, are given in Table I below, with data provided by amidopyrine used as a reference substance.

Acute toxicity

The tests were carried out on Swiss mice of the CD1 strain, of both sexes, and the 50 percent lethal doses were calculated graphically.

Analgesic effect

This effect was investigated in accordance with two conventional experimental procedures.

a. Effect against pain induced, in CD1 mice, by the intraperitoneal injection of acetic acid, in accordance with the method described by Koster and colleagues (Fed. Proc., 1959, 18, 42) and modified by Peterfalvi, Branceni and colleagues (Med. Pharmacol. exp., 1966, 15, 254).

b. Test using a plate heated by acetone vapours, carried out on CD1 mice in accordance with the technique of Eddy and Leimbach (J. Pharm. exp. Therap., 1953, 107, 386).

The results obtained in the Koster test, which demonstrates effects of the peripheral type, show that the activity of the majority of the compounds investigated is very much greater than that of the reference substance.

In the heated plate test, all the compounds of the invention possess a much greater activity than the reference substance.

Anti-inflammatory effect

The test of oedema induced by carragenin in S. J. rats, according to the technique of Winter and colleagues (Proc. Soc. exp. Biol. Med., 1962, 111, 544) was used. The compounds of the invention possess an activity which is lower than that of the reference product.

TABLE 1

| Compound | Acute toxicity LD 50 per os mg/kg | Analgesic effect, mg/kg per os. | | Anti-inflammatory effect, mg/kg, per os AD 40 (c) |
| --- | --- | --- | --- | --- |
| | | Koster test AD50 (a) | Eddy test MAD (b) | |
| SL B 092 | 325 | 1-3 | 15 | 100-150 |
| SL B 151 | 800 | 75 | 30 | 75 |
| SL B 261 | 650 | 4 | 10 | 100-150 |
| Amidopyrine | 800 | 40 | 175 | 50 |

(a) AD 50 = 50% active dose (dose which reduces the number of contortions induced by acetic acid by 50%)
(b) MAD = Mean active dose (dose which increases the reaction time by 100%)
(c) AD 40 = 40% active dose (dose which reduces the volume of the oedema induced by carragenin in the control animals by 40%)

These experimental data show that the compounds of the invention possess very marked analgesic properties, greater than those of amidopyrine. They also show a marked dissociation between the analgesic properties and the anti-inflammatory properties, in favour of the first. This dissociation is very valuable in the treatment of specific algias.

The compounds of formula I and their salts can thus be used in human and veterinary medicine, in the treatment of the various pain syndromes. They consequently form the active principles of paramaceutical compositions wherein they are combined with a compatible carrier so that they can be administered orally, endorectally or parenterally. These pharmaceutical compositions can also contain other medicinal substances with which the compounds of formula I are pharmaceutically and therapeutically compatible.

For oral administration, any pharmaceutical forms suitable for this method are used, that is to say tablets, dragees, gelatine-coated pills, capsules, cachets and drinkable solutions or suspensions, e.g., a syrup or elixir. The unit dose of the compound of formula I is from 20 to 500 mg, and the daily dose may be from 100 to 1,500 mg per day.

For rectal administration, suppositories containing 50 to 1,000 mg of the compound of formula I are used and are administered to the patient at the rate of 1 to 3 per 24 hours.

For parenteral administration, injectable solutions buffered to the physiological pH are used and are prepared before hand or at the time of use. The unit dose is from 25 to 500 mg and the maximum daily dose is 1,000 mg.

We claim:

1. A method of relieving pain which comprises administering to a subject suffering therefrom an effective amount of a piperazine of the formula:

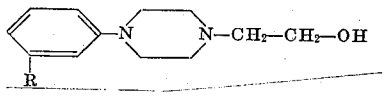

in which R is $CF_3$, $OCF_3$ or $SCF_3$ or an addition salt thereof with a pharmaceutically tolerated acid.

2. A method according to claim 1, in which from 100 to 1,500 mg. of said piperazine is administered orally.

3. A method according to claim 1, in which from 50 to 3,000 mg. of said piperazine is administered rectally.

4. A method according to claim 1, in which from 25 to 1,000 mg. of said piperazine is administered parenterally.

5. A method of claim 1, wherein said piperzine is 2-(4-m-trifluoromethylphenyl-piperazino)-ethanol, its monohydrochloride or its mono-2-acetoxy-benzoate.

6. A method of claim 1 wherein said piperazine is 2-(4-m-trifluoromethylthiopenyl-piperazino)-ethanol or its monohydrochloride.

* * * * *